United States Patent [19]

Hickok et al.

[11] 4,264,163
[45] Apr. 28, 1981

[54] EXPOSURE CONTROL APPARATUS WITH COMPENSATION FOR FILM RECIPROCITY FAILURE

[75] Inventors: William K. Hickok, Rochester; Robert C. Wheeler, Elba, both of N.Y.

[73] Assignee: Eastman Kodak Company, Rochester, N.Y.

[21] Appl. No.: 7,528

[22] Filed: Jan. 29, 1979

[51] Int. Cl.³ .............................................. G03B 7/083
[52] U.S. Cl. .................................. 354/51; 250/214 P
[58] Field of Search ..................... 250/214 P, 214 RC; 354/28, 37, 41, 48, 50, 51, 58

[56] References Cited

U.S. PATENT DOCUMENTS

| Re. 26,627 | 7/1969 | Burgarella . |
|---|---|---|
| 3,386,358 | 6/1968 | Kropp . |
| 3,711,721 | 1/1973 | Hansen .............................. 250/214 P |
| 4,037,237 | 7/1977 | Maigret .................................. 354/51 |
| 4,085,411 | 4/1978 | Genesi .................................... 354/51 |

Primary Examiner—David C. Nelms
Assistant Examiner—Edward P. Westin
Attorney, Agent, or Firm—D. P. Monteith

[57] ABSTRACT

A camera includes a photographic film having a given film speed which decreases when the film is exposed to light which varies from a given illumination level. A camera shutter is controlled by a timing circuit adapted to produce an exposure which is adjusted to compensate for the decreased film speed.

10 Claims, 5 Drawing Figures

EXPOSURE CONTROL APPARATUS WITH COMPENSATION FOR FILM RECIPROCITY FAILURE

BACKGROUND OF THE INVENTION

1. Field of the Invention

This invention relates generally to a camera having electronic exposure control apparatus, and more particularly, to improved exposure control apparatus for compensating for the reciprocity failure characteristic of film in the camera.

2. Description Relative to the Prior Art

The speed of a photographic film is an expression of its sensitivity to light. Film speed is measured by subjecting a film to a range of exposures under standard conditions of illumination. The film blackening (density) produced after film processing is measured and plotted (usually logarithmically) against the exposure. The speed of the film can be derived from the resulting graph, which is known as the characteristic curve.

Film speed is defined as a function of the exposure at a specific point of the characteristic curve. One commonly preferred method of determining film speed is defined by the formula: Speed=0.8/E where E is the exposure corresponding to the point on the characteristic curve at which the density is 0.1 above the base plus fog density (density in the negative not forming part of the photographic image).

Film exposure equals illumination (light intensity) multiplied by film exposure time. According to the reciprocity law of photochemistry, so long as the exposure (the product of illumination and exposure time) is held constant, the photographic effect will always be the same, i.e. if intensity is doubled and exposure time halved, the density produced should be unaffected. In practice, a photographic emulsion does not strictly follow this law. A given emulsion is most sensitive to illumination of a particular intensity. When light intensity varies greatly from this ideal, then the reciprocity law no longer applies. Very low light intensities with correspondingly long exposure times, or very high light intensities with very short exposure times, produce less effect. The loss of sensitivity for low intensity—long time-film exposures is known as low intensity film reciprocity failure. The loss of sensitivity for high intensity—short duration-film exposures is known as high intensity reciprocity failure. In either case more than a calculated exposure may be required.

For black-and-white films, the loss of effective speed is relatively unimportant because of wide film exposure latitude. On the other hand, with multilayer color films, which have a more narrow exposure latitude, it is often necessary to give more than a calculated exposure when light varies from a particular intensity. This is particularly true for a photographic process that has a narrow exposure latitude such as utilized in self-processing cameras.

U.S. Pat. No. 3,711,721 discloses camera exposure control apparatus having a photocell that produces a photocurrent, related to light intensity, for charging a timing capacitor. When the charge on the capacitor reaches a predetermined level, a shutter closing signal is produced. Low intensity reciprocity failure of the film employed is intended to be accounted for by progressively attenuating the photocurrent during film exposure. This is done by energizing the photocell with a pulse drive signal, the duty cycle of which is progressively reduced during the exposure interval. By this apparatus, for any given level of scene brightness the photocell produces a photocurrent which is correspondingly progressively reduced. The rate at which the capacitor is charged is reduced as a function of time to produce somewhat longer exposure intervals and, accordingly, to produce exposures, when the film is exposed to low intensity light, that are somewhat larger than a calculated exposure, to account for low intensity reciprocity failure.

This circuitry is relatively complicated. Accordingly, it suffers from a disadvantage in that it would not be readily manufacturable in integrated circuit form by a high yield integrated circuit process. Furthermore, a photocell does not respond instantaneously in an accurate manner to light when it is first turned ON. By sequentially turning the photocell ON and OFF at a high rate during an exposure, the photocurrent may not accurately represent the intensity of the light. In addition, because the photocurrent is attenuated in proportion to the exposure interval, no meaningful compensation can be provided for high intensity reciprocity failure.

SUMMARY OF THE INVENTION

The present invention is constituted by a photographic camera having electronic exposure control apparatus, and light-responsive circuitry for controlling the exposure control apparatus to effect a film exposure. The magnitude of the film exposure is a function of scene illumination, to compensate for the reciprocity failure characteristic of the film.

According to a preferred embodiment of the invention, a camera includes means for receiving a photographic film having a predetermined effective film speed which, according to the low intensity reciprocity failure characteristic of the film, is decreased when the film is exposed to low intensity light less than a given brightness level. The camera has an actuatable shutter movable with respect to an exposure aperture for initiating and terminating exposure of the film to light. A photometer is arranged to receive light to produce a photosignal representing the brightness of a scene being photographed. A timing capacitor is chargeable at a rate relating to the predetermined effective film speed to establish a film exposure interval. The timing capacitor and photometer define a first timing circuit which, if responsive to the photosignal, would charge the timing capacitor to a predetermined voltage in a period of time termed the "uncompensated exposure time."

The camera further includes means for providing a reference signal representing a predetermined brightness level which is no greater than the given brightness level. A level-sensing circuit, coupled to the photometer, the reference signal providing means and the timing capacitor, and responsive to the photosignal and the reference signal produces an exposure-controlling signal. The level-sensing circuit has (1) a first state for producing an exposure-controlling signal proportional to the photosignal by a first factor when scene brightness is below the predetermined brightness level, and (2) a second state for producing an exposure-controlling signal proportional to the photosignal by a second factor when scene brightness is above the predetermined level, the first factor being less than the second factor.

The timing capacitor and the levelsensing circuit define a second timing circuit which is responsive to the exposure-controlling signal to charge the timing capacitor to the predetermined voltage in a period of time termed the "compensated exposure time." The second timing circuit is related to the first timing circuit such that the compensated exposure time exceeds the uncompensated exposure time when scene brightness is below the predetermined level to compensate for the effect of the decrease in effective film speed when the film is exposed to low intensity light less than said predetermined brightness level. A voltage-sensitive means, coupled between the timing capacitor and the shutter, is responsive to the timing capacitor being charged to the predetermined voltage for actuating the shutter to terminate exposure, whereby a film exposure is effected that compensates for the effect of the low intensity reciprocity failure characteristic of the film.

The invention and its objects and advantages, will become more apparent in a detailed description of a preferred embodiment presented below.

DESCRIPTION OF THE DRAWINGS

In a detailed description of preferred embodiments of the invention presented below, reference is made to the accompanying drawings, in which.

DESCRIPTION OF PREFERRED EMBODIMENTS OF THE INVENTION

Because photographic cameras are well known, the present description will be directed in particular to elements forming part of, or cooperating directly with, apparatus in accordance with the present invention. It is to be understood that elements do not specifically shown or described may take various forms well known to those having skill in the photographic art.

Figure 1:
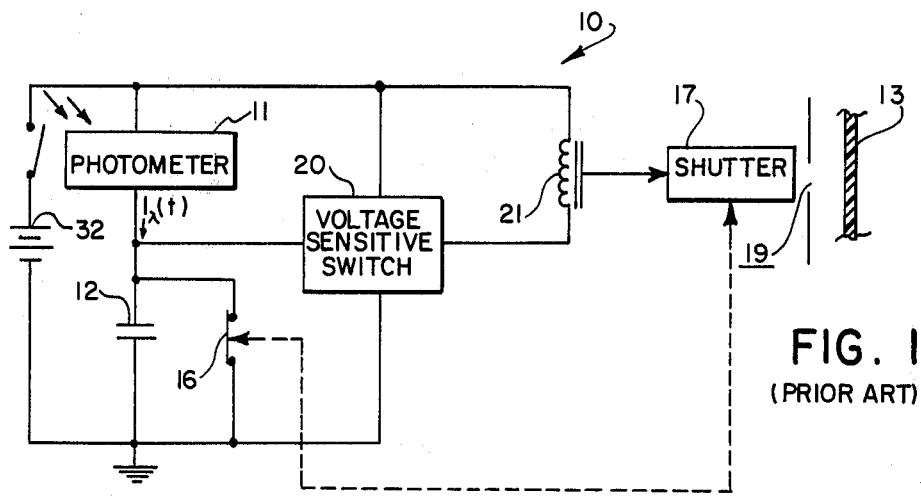
FIG. 1 illustrates in block diagram form a camera having photoconductively controlled exposure control apparatus of the type employed in the prior art.

There is shown in FIG. 1, a camera, denoted generally 10, having a photometer 11 arranged to receive light preferably from a scene being photographed. The photometer produces a photocurrent $I_\lambda(t)$, the magnitude of which is linearly proportional to the intensity of light impinging on it. The current gradient can, for example, be on the order of 700 nanoamperes per foot-candle (na/f-c). In view of the generally linear response of the photometer over its normal range of operation, the term photocurrent as hereinafter described is in terms of nanoamperes per foot-candle. A photometer is disclosed in commonly assigned U.S. Pat. No. 4,059,836, the disclosure of which is incorporated herein by reference.

A timing capacitor 12, connected in series to the output of the photometer 11, is charged to a predetermined voltage, to produce an exposure termination signal, at a rate that is proportional to scene brightness, represented by the photocurrent, and a predetermined speed of film 13 in the camera 10. That predetermined speed corresponds to the sensitivity of the film when it is exposed to light intensities wherein the reciprocity law applies.

A normally closed switch 16 parallel to the capacitor 12, to thereby short circuit the capacitor, is opened in synchronization with opening movement of a camera shutter 17 to permit the capacitor to charge as the film 13 is exposed to scene light passing through an exposure aperture 19. The voltage across capacitor 12 is applied to the input stage of a voltage-sensitive switching circuit 20. The operational state of the output stage of the switching circuit 20, which controls an electromagnet 21, is reversed when the capacitor produces its exposure termination signal, which represents a desired film exposure. When such exposure is achieved, the electromagnet 21 is actuated to close the shutter 17. The elements thus far described are part of conventional electronically operated shutter control apparatus known in the prior photographic art.

In exposure control apparatus, as shown in FIG. 1, an exposure interval is related to the time required for the capacitor 12 to charge to the predetermined voltage level. For such apparatus, the time (T) required for the capacitor having a capacitance (C) charged by an average current (I) to a predetermined voltage (V) is given by:

$$T = C \times V/I$$

To adjust an exposure interval in accordance with a predetermined film speed, the capacitance and/or the predetermined voltage level are selectively controlled. For example, the capacitance value would be lower for a high-sensitivity or fast film than for a slower speed film.

In the exposure control apparatus of FIG. 1, during film exposure the voltage across the timing capacitor 12 is related linearly to the time integral of the photocurrent, and thereby to the time integral of illumination impinging on the film 13. Therefore, the exposure interval is related inversely to the brightness of the scene being photographed, and the film 13 is subject to the same exposure, independent of scene illumination level. No exposure adjustment is made to compensate for the effect of the decreased effective film speed when the film is exposed to (1) low light intensities with correspondingly long-duration exposures, or (2) high light intensities with correspondingly shortduration exposures, where the reciprocity law no longer applies.

Figure 2:
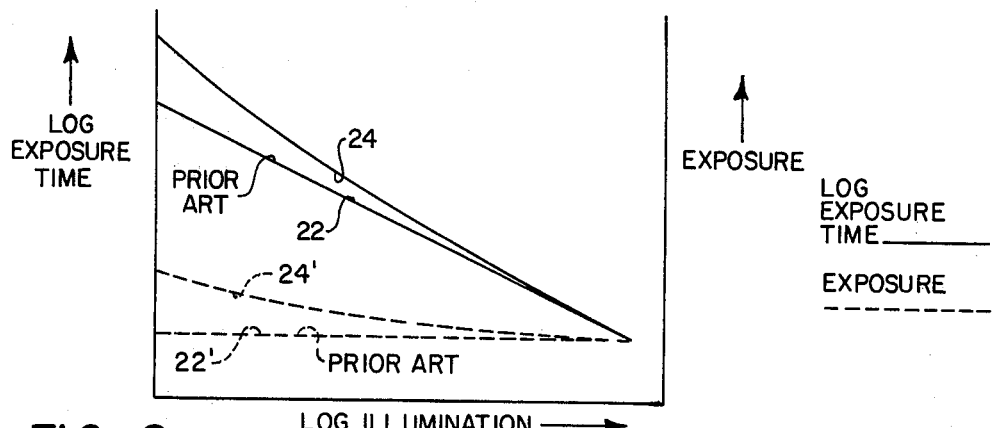
FIG. 2 illustrates, as a function of log illuminatiion, both log exposure time and exposure produced by (1) prior art exposure control apparatus that does not account for film reciprocity failure and (2) exposure control apparatus that accounts for low intensity film reciprocity failure characteristic.

The adjustment that is needed to compensate for the effect of low intensity reciprocity failure can be better understood by referring to FIG. 2 in which a curve 22 and a curve 22' are included that illustrate, as a function of log illumination, log exposure time and exposure, respectively, that are produced by prior art electronic exposure control apparatus which does not adjust an exposure to account for film reciprocity failure characteristic. It is to be noted that for such prior art apparatus, exposure is constant, as shown by curve 22'. On the other hand, the curve, denoted 24' in FIG. 2, illustrates, the exposure required to properly expose a typical photographic film to low light intensities wherein the reciprocity law does not apply. The difference between the curve 22' and the curve 24' illustrates the effect of low intensity film reciprocity failure. It will be noted by comparing the curve 24' to the curve 22', that the law of reciprocity does not apply when the film is exposed to light which is less than a given illumination level, i.e., where the curve 24' diverges from the curve 22'. Furthermore, additional exposure is required to compensate for the decrease in film speed, the lower the illumination. This additional exposure can be provided for by increasing exposure time as shown by the curve 24.

To compensate for low intensity reciprocity failure of the film utilized, film exposure is varied as a function of illumination for low light intensities such as those intensities less than the aforementioned given illumination level. More particularly, the film must be subjected to an additional amount of light under dull or low light conditions than is required to properly expose the film under brighter or more normal light conditions where the reciprocity law applies. Likewise, the lower the light intensity the greater is the amount of additional illumination that is required for a proper film exposure. In accordance with a preferred embodiment of the invention, a correction for low intensity film reciprocity failure is provided for by circuit means that adjusts the relationship or ratio between the magnitude of an exposure-controlling signal, representing scene light received by the film, and a photosignal, representing scene light intensity, as a function of scene light intensity. By adjusting this ratio, referred to hereinafter as current transfer gain, in proportion to scene light intensity, a timing capacitor, such as capacitor 12, is charged by the exposure-controlling signal under low light conditions at a rate that is disproportionate to the rate that the capacitor is charged under bright light conditions. This disproportionate capacitor charging rate causes the film to be subjected to an exposure under low light conditions that is larger than an exposure made under brighter light conditions where the reciprocity law applies.

The invention includes circuitry for modifying the typically linear relationship between log exposure time and log illumination (curve 22 of FIG. 2) to produce a non-linear relationship between log exposure time and log illumination, illustrated by the curve 24. By adjusting exposure time as shown by the curve 24, the film 13 is subjected to greater amounts of exposure, for low illumination values, as illustrated by the curve 24'.

As mentioned previously herein, the time (T) required to charge a capacitor of capacitance (C) to a predetermined voltage (V) with average current (I) is given by:

$$T = C \times V/I$$

Figure 4:
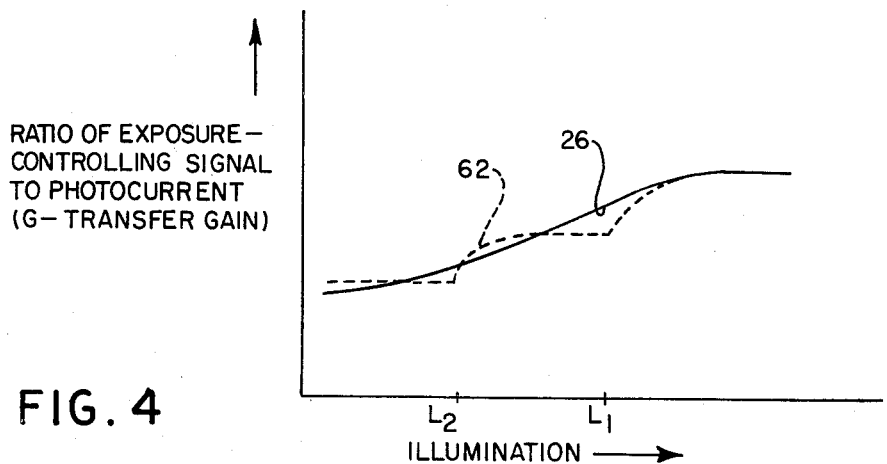
FIG. 4 illustrates, as a function of illumination, current transfer gain for the control circuit shown in FIG. 3, where current transfer gain is the ratio of an exposure-controlling signal to a photosignal.

Therefore, the curve 24 of FIG. 2 can be utilized to determine a current transfer gain for an exposure control circuit for producing an exposure as shown by the curve 24' where transfer gain is defined as the ratio of the magnitude of a current for charging a timing capacitor, to the photocurrent $I_\lambda(t)$. Such a transfer gain is shown generally in FIG. 4 by a continuous curve denoted 26, which illustrates that a transfer gain that progressively decreases for low illumination values less than a given illumination value where the reciprocity law does not apply can account for the effect of low intensity film reciprocity failure.

Figure 3:
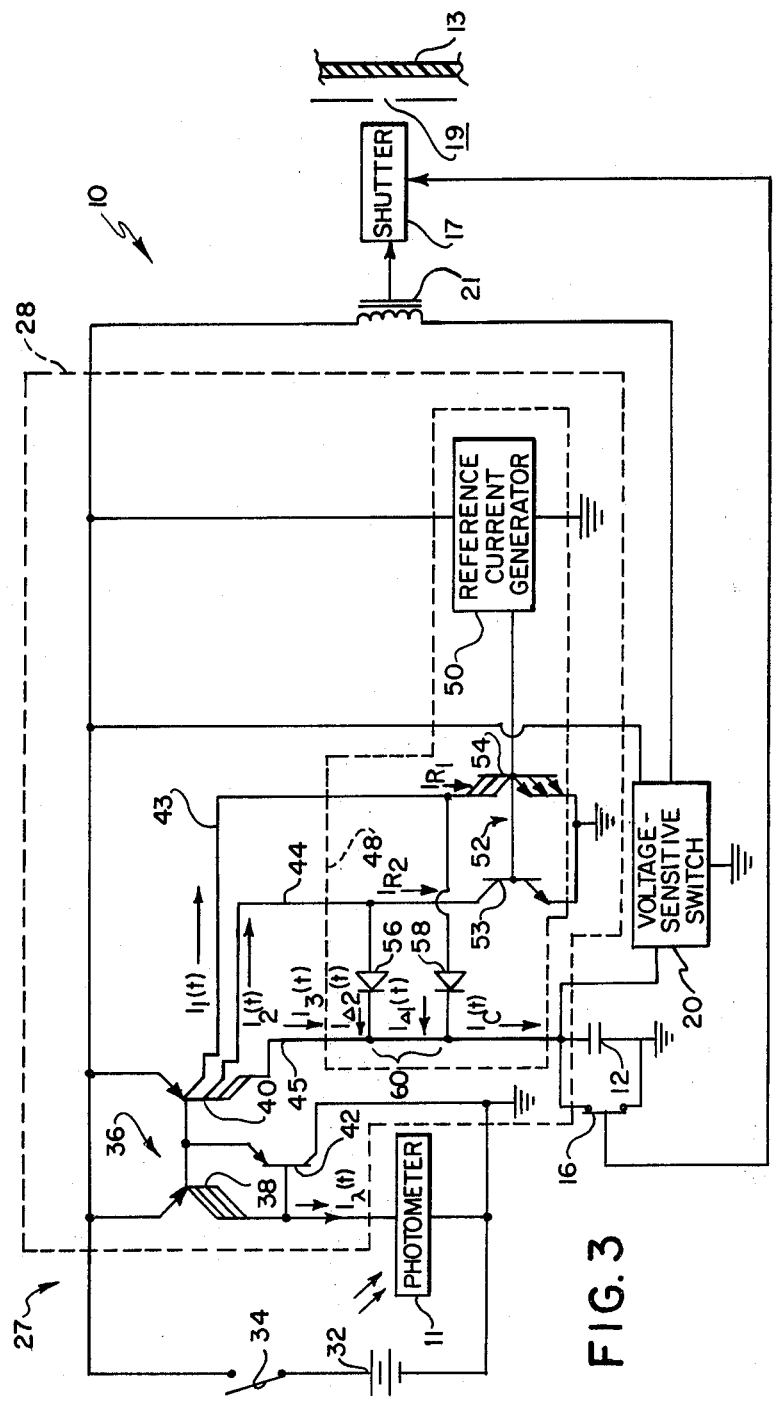
FIG. 3 illustrates, partially in block diagram form, a photographic camera having a control circuit, according to the present invention, for controlling exposure control apparatus to effect an exposure of film in the camera that takes into account the low intensity reciprocity failure characteristic of the film.

An exposure control circuit 27 embodying compensating means, denoted 28, for producing a transfer gain for the control circuit that decreases for low illumination values is shown schematically in FIG. 3. Compensating means 28 in combination with the timing capacitor 12 constitutes a timing circuit for producing an exposure interval which compensates for the effect of the decrease in effective film speed when the film is exposed to low light intensities. Apparatus shown in FIG. 3 that correspond to and perform the same function as apparatus shown in FIG. 1 is identified by the same numerals utilized in FIG. 1.

The exposure control circuit 27 includes a battery 32 that is connected in series with a main power switch 34. The main power switch 34 is adapted to be closed to activate the circuit 27 prior to exposure control, such as in response to initial movement of a camera shutter release button (not shown).

The compensating means 28 includes a so-called "current-mirror" circuit 36 for supplying current equal to the photocurrent $I_\lambda(t)$ produced by the photometer 11. A current-mirror circuit and its application in a light detector system are described in U.S. Pat. No. 4,085,411, the disclosure of which is incorporated herein by reference. Current-mirror circuit 36 includes PNP transistors 38, 40, and 42. The emitter electrode area and the base electrode area of the transistors 38 and 40 are respectively equal. The respective base electrodes and emitter electrodes of these two transistors have common connections, as shown in FIG. 3. Therefore, the transistor 40 will produce a collector current substantially identical to that of the collector current of the transistor 38, the latter current being approximately equal to the photocurrent $I_\lambda(t)$. The transistor 42 is provided in a well known manner so that the total collector current of the transistor 40 more accurately approximates the collector current of the transistor 38. Therefore, the photocurrent $I_\lambda(t)$ is "mirrored" in the collector of the transistor 40.

The four collector electrodes of the transistor 40 constitute means for dividing the "mirrored" photocurrent $I_\lambda(t)$ to form output currents $I_1(t)$, $I_2(t)$ and $I_3(t)$ on output lines 43, 44, and 45 respectively. The transistor 40 is constructed such that its four collector electrode areas are equal. Accordingly, and because two of these collector electrode areas are connected together to form the current $I_3(t)$, as shown in FIG. 3, the output currents $I_1(t)$ and $I_2(t)$ are equal and are approximately $\frac{1}{4}$ of $I_\lambda(t)$, and the current $I_3(t)$ is twice either $I_1(t)$ or $I_2(t)$. Therefore, $I_3(t)$ is equal to one-half $I_\lambda(t)$. In other words, for a photometer of the type described with respect to FIG. 1, the output currents $I_1(t)$ and $I_2(t)$ can be, for example, approximately 175 na/f-c, and the output current $I_3(t)$ can be approximately 350 na/f-c. It is not necessary to limit the total light dependent current, produced by the current-mirror circuit 36, to the photocurrent produced by the photometer 11. The total current produced by the circuit 36 can be any reasonable fraction or multiple of the photocurrent.

The compensating means 28 also includes a current processing circuit 48 which consists of a reference current generator 50, a current-mirror circuit 52 comprising NPN transistors 53 and 54, and a pair of level-sensing electronic switches in the form of diodes 56 and 58. Reference current generator 50 supplies a constant current to the base electrodes of the transistor 53 and the transistor 54. The areas of the emitter electrode and the collector electrode of transistor 54 are three times the areas of the emitter electrode and collector electrode, respectively, of transistor 53, as indicated schematically in FIG. 3. Therefore, the collector current drawn by transistor 54, referred to hereinafter as reference current $I_{R1}$, is three times the collector current, referred to hereinafter as reference current $I_{R2}$, "mirrored" in and drawn by transistor 53. The current $I_1(t)$ is equal to the reference current $I_{R1}$ when scene light intensity is a predetermined level $L_1$, and the current $I_2(t)$ is equal to the reference current $I_{R2}$ when scene light intensity is $L_2$. $L_1$ is the light level above which there is a range of light levels where the film 13 generally obeys the law of reciprocity with film exposure intervals of reasonable duration. Accordingly, $L_1$ is no greater than the aforementioned given illumination level, i.e. where the curve 24' of FIG. 2 diverges from the curve 22'. $L_2$ is the light level below which there is a range of light levels where the effect of low intensity reciprocity failure of film 13 is most severe. In a preferred embodiment of the circuit 27 of FIG. 3, $I_{R1}$ is approximately 150 nanoamperes, and $I_{R2}$ is approximately 50 nanoamperes. Therefore, when scene illumination is approximately 0.85 foot-candle ($L_1$), $I_1(t)$ equals $I_{R1}$, and when scene illumination is approximately 0.28 footcandle ($L_2$), $I_2(t)$ equals $I_{R2}$.

The diodes 58 and 56 conduct to provide currents, referred to hereinafter as difference currents $I_\Delta(t)$, to a junction 60 when photocurrents $I_1(t)$ and $I_2(t)$, provided by current-mirror circuit 36, are greater than their respective reference currents, $I_{R1}$ and $I_{R2}$, provided by current-mirror circuit 52. That is, when the photocurrent $I_1(t)$ is greater than the reference current $I_{R1}$, a difference current $I_{\Delta 1}(t)$ equal to $I_1(t)-I_{R1}$, flows through diode 58 to the junction 60. Likewise, when $I_2(t)$ is greater than $I_{R2}$, a difference current $I_{\Delta 2}(t)$ equal to $I_2(t)-I_{R2}$, flows through diode 56 to junction 60. In other words, when scene light intensity is greater than $L_1$, the difference current $I_{\Delta 1}(t)$ flows through the diode 58 and the difference current $I_{\Delta 2}(t)$ flows through the diode 56. When scene light intensity is less than $L_1$ but is greater than $L_2$, the only difference current that is produced is $I_{\Delta 2}(t)$.

Also, when both photocurrents $I_1(t)$ and $I_2(t)$ are less than their respective reference currents, neither diode 56 nor diode 58 conducts. That is, when scene light intensity is less than $L_2$, no difference current is produced.

From the foregoing description particularly when read in light of the schematic diagram of circuit 27, shown in FIG. 3, it shall be clear to those skilled in the art that a capacitor charging current $I_c(t)$, referred to hereinafter as an exposure-controlling signal, for charging the timing capacitor 12 can equal any of the following three current signals:

$$I_c(t) = I_3(t) \quad (1)$$
$$= \frac{I_\lambda(t)}{2}$$

when $I_1(t)$ is less than $I_{R1}$ and $I_2(t)$ is less than $I_{R2}$ $$I_c(t) = I_3(t) + I_{\Delta 2}(t) \quad (2)$$
$$= I_3(t) + I_2(t) - I_{R2}$$
$$= \frac{3I_\lambda(t)}{4} - I_{R2}$$

when $I_1(t)$ is less than $I_{R1}$ and $I_2(t)$ is greater than $I_{R2}$, and $$I_c(t) = I_3(t) + I_{\Delta 1}(t) + I_{\Delta 2}(t) \quad (3)$$
$$= I_3(t) + I_1(t) - I_{R1} + I_2(t)$$
$$I_{R2} = I_\lambda(t) - I_{R1} - I_{R2}$$

when $I_1(t)$ is greater than $I_{R1}$. (Because of the relative magnitudes of $I_1(t)$ and $I_2(t)$, and $I_{R1}$ and $I_{R2}$, $I_2(t)$ is necessarily greater than $I_{R2}$ whenever $I_1(t)$ is greater than $I_{R1}$.) That is, the exposure-controlling signal, $I_c(t)$, equals the following:

$$I_c(t) = \frac{I_\lambda(t)}{2}$$

when scene light intensity (L) is less than $L_2$;
(2) $I_c(t) = \frac{3}{4} I_\lambda(t) - I_{R2}$ when L is greater than $L_2$, but less than $L_1$; and
(3) $I_c(t) = I_\lambda(t) - I_{R1} - I_{R2}$ when L is greater than $L_1$.

The current transfer gain, G, of the circuit 27, defined as the ratio of the exposure-controlling signal $I_c(t)$ to the photocurrent $I_\lambda(t)$, i.e.

$$G = \frac{I_c(t)}{I_\lambda(t)},$$

is not constant as is the case with prior art exposure control apparatus not having film reciprocity compensation, but increases as illumination increases. If photometer 11 produced a photocurrent $I_{80}(t)$ of 700 na/f-c, the transfer gain, G, for the circuit 27 would be as follows:

$$G = \frac{I_\lambda(t)/2}{I_\lambda(t)} \quad (1)$$
$$= \frac{1}{2}$$

when L is less than $L_2$ $$G = \frac{\frac{3}{4}I_\lambda(t) - I_{R2}}{I_\lambda(t)} \quad (2)$$

when L is greater than $L_2$ and less than $L_1$. As L varies from $L_2$ to $L_1$, G varies from about $\frac{1}{2}$ to about $\frac{3}{4}$, respectively.

$$G = \frac{I_\lambda(t) - I_{R1} - I_{R2}}{I_\lambda(t)} \quad (3)$$

when L is greater than $L_1$. As L increases from $L_1$, G increases from about $\frac{3}{4}$ and approaches 1 asymptotically. This transfer gain, G, illustrated in FIG. 4 by the curve 62, is a piece-wise approximation to the desired transfer gain curve 26 of FIG. 4.

From the foregoing, it is clear that the exposure-controlling signal is related to scene light by one factor for low scene light intensities and a higher factor for brighter scene light intensities. Accordingly, in low light conditions the timing capacitor 12 is caused to charge at a rate that is disproportionately slower than the rate at which the timing capacitor would charge in brighter light conditions, particularly where the reciprocity law applies. As a result, for low light levels in which exposure compensation is needed to offset the effect of low intensity film reciprocity failure, the film 13 receives a greater amount of exposure than it receives under bright light conditions. This additional exposure compensates for the decrease in effective film speed brought about by reciprocity failure of the film.

Figure 5:
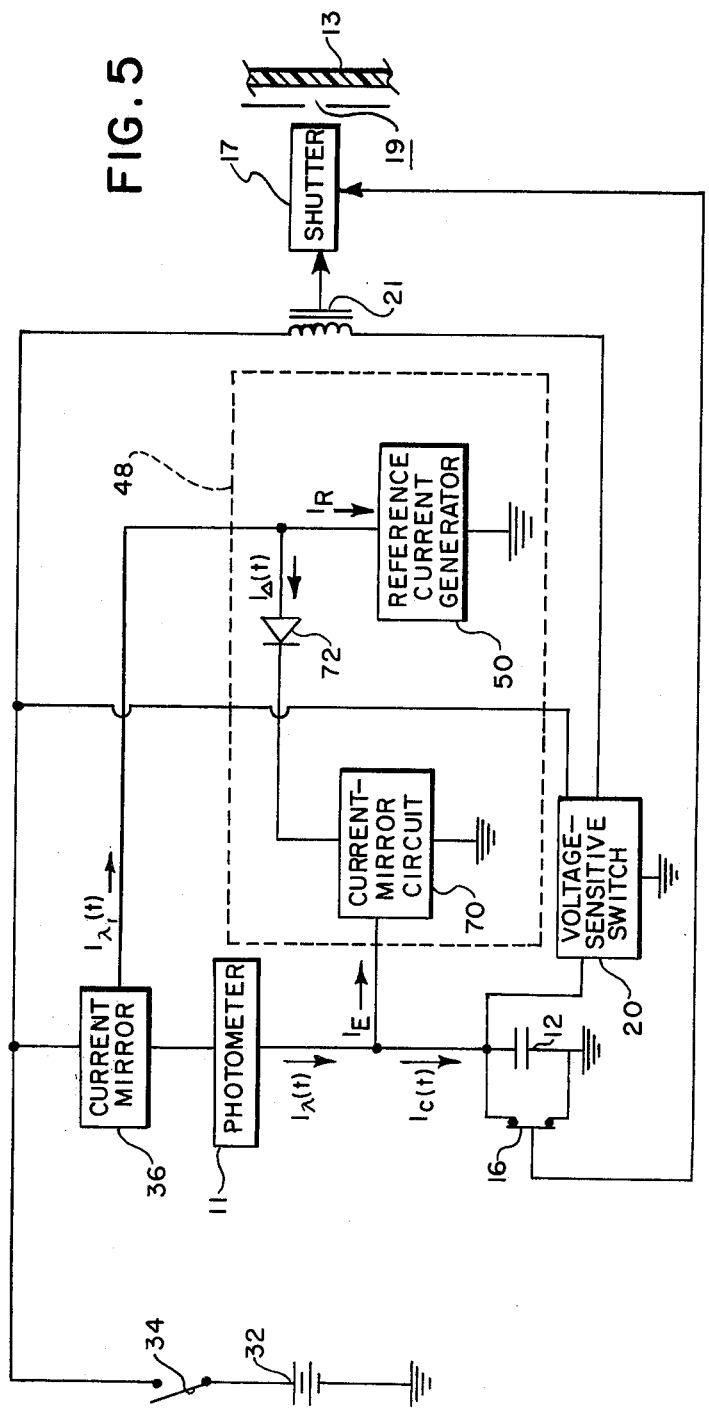
FIG. 5 illustrates, primarily in block diagram form, exposure control apparatus for adjusting an exposure to compensate for high intensity film reciprocity failure.

There is shown in FIG. 5 exposure control apparatus for adjusting an exposure to compensate for high intensity film reciprocity failure. To compensate for high intensity reciprocity failure the current processing circuit 48 regulates the magnitude of the exposure-controlling signal $I_c(t)$ by means of controlling an error current $I_E$. The current processing circuit 48 includes a currentmirror circuit 70, level-sensing circuitry 72 in the form of a diode 72, and the reference current generator 50.

The reference current generator 50 produces a reference current $I_R$, which represents a predetermined brightness level. This predetermined brightness level is at least as great as a given brightness level above which there exists a range of illumination where the reciprocity law does not apply, e.g. where high intensity reciprocity failure occurs.

The diode 72 is responsive to a photocurrent $I_{\lambda}(t)$, produced by the photometer 11, and the reference current $I_R$, and produces a difference current $I_\Delta(t)$ whenever the photocurrent $I_{\lambda 1}(t)$ is greater than the reference current $I_R$. Therefore, whenever scene light intensity is greater than the light intensity represented by the current $I_R$, the diode 72 conducts and the difference current $I_\Delta(t)$ is produced.

The current-mirror circuit 70 produces the error current $I_E$, which equals the difference current $I_\Delta(t)$. In other words, whenever scene light intensity is in a range where the reciprocity law does not apply, the error signal $I_E$ is produced.

The exposure-controlling signal is equal to the photocurrent $I_\Delta(t)$ minus the error current $I_E$. From the foregoing, it is clear that the exposure-controlling signal $I_c(t)$ is proportional to scene light by one factor for scene light intensities where the reciprocity law applies, and is proportional to scene light by a second, lower factor for brighter light intensities where the reciprocity law does not apply. Accordingly, in bright light conditions the timing capacitor 12 is caused to charge at a rate that is disproportionately slower than the rate at which the capacitor charges in light conditions where the reciprocity law applies. As a result, for bright light conditions, photographic film receives additional exposure than is received under normal light conditions, to offset the effect of high intensity reciprocity failure. For bright light levels where the reciprocity law does not apply, the timing capacitor 12 is charged at a rate to produce an exposure in an interval of time termed "the compensated exposure time." Because the second factor is less than the first factor, the compensated exposure time is greater than an interval of time termed "the uncompensated exposure time" which would be the exposure interval if the timing capacitor 12 were charged by an exposure-controlling signal proportional to scene light by the first factor. Accordingly, when scene light is greater than such predetermined brightness level, an exposure is produced that is somewhat greater than the exposure produced when scene light is below the predetermined brightness level, to compensate for the decrease in effective film speed when photographic film is exposed to high light intensities.

The invention has been described in detail with reference to the Figures; however, it will be appreciated that variations and modifications are possible which are within the spirit and scope of the invention. For example, it can readily be understood by those skilled in the art that the curve 62 can be made to more accurately approximate the curve 26 by causing the breakpoints, at which distinct changes in the transfer gain are made, to occur more frequently as light level changes. With reference to FIG. 3, this can be done by dividing the photocurrent $I_\Delta(t)$ into a larger number of signals, such as $I_1(t)$ and $I_2(t)$, and by correspondingly including additional switching diodes, such as diodes 56 and 58, and associated reference currents in current processing circuit 48.

What is claimed is:

1. In a photographic camera having means for receiving a photographic film having a speed which decreases when exposed to low-intensity light, the improvement comprising:
   (a) means for producing a light-dependent signal corresponding to the brightness of a scene;
   (b) means for providing a reference signal corresponding to a predetermined light intensity below which the speed of received photographic film decreases;
   (c) switch means, responsive to (i) the reference signal and (ii) the light-dependent signal, having (1) a first condition for causing an exposure-controlling signal to be produced that is related to scene brightness by a first factor when the brightness of the scene is below the predetermined light intensity, and (2) a second condition for causing an exposure-controlling signal to be produced that is related to scene brightness by a second factor when the brightness of the scene is above the predetermined light intensity; and
   (d) exposure-determining means, conected to said switch means and associated with said film receiving means for causing a first film exposure to occur when the exposure-controlling signal is related to scene brightness by the first factor, and for causing a second film exposure to occur when the exposure-controlling signal is related to scene brightness by the second factor, the first film exposure being greater than the second film exposure to compensate for the decrease in speed when the film is exposed to light the intensity of which is less than the predetermined light intensity.

2. In a photographic camera having means for receiving a photographic film having a speed which decreases when exposed to low-intensity light, the improvement comprising:
   (a) means for producing a light-dependent signal corresponding to the brightness of a scene;
   (b) means for providing a reference signal corresponding to a predetermined light intensity below which the speed of received photographic film decreases;
   (c) level-sensing switching means having an input coupled to said light-sensitive means and said reference signal providing means, and an output, said level-sensing switching means being responsive to the light-dependent signal and the reference signal, and having (1) a first condition for causing an exposure-controlling signal to be produced at said output that is proportional to scene brightness by a first factor when the brightness of the scene is below the predetermined light-intensity, and (2) a second condition for causing an exposure-controlling signal to be produced at said output that is proportional to scene brightness by a second factor when the brightness of the scene is above the predetermined light intensity; and (d) exposure-determining means, connected to said output of said switching means and associated with said film receiving means, for causing a first film exposure to occur when the exposure-controlling signal is proportional to scene brightness by the first factor, and for causing a second film exposure to occur when the exposure-controlling signal is proportional to scene brightness by the second factor, the first film exposure being greater than the second film exposure to compensate for the decrease in film speed when the film is exposed to light the intensity of which is less than the predetermined light intensity.

3. In a photogrpahic camera having means for receiving a photographic film having a speed which decreases when exposed to low-intensity light, and an actuatable shutter movable for initiating and terminating exposure of the film to light, the improvement comprising:

(a) means for producing a photosignal corresponding to the brightness of a scene;

(b) means for providing a reference signal corresponding to a predetermined light intensity below which the speed of received photograhpic film decreases;

(c) switch means, responsive to (i) the photosignal and (ii) the reference signal, having (1) a first condition for causing an exposure-controlling signal to be produced that is proportional to scene brightness by a first factor when the brightness of the scene is below the predetermined light intensity, and (2) a second condition for causing an exposure-controlling signal to be produced that is proportional to scene brightness by a second factor when the brightness of the scene is above the predetermined light intensity; and (d) timing means, coupled between said switch means and said shutter, responsive to the exposure-controlling signal to actuate said shutter to cause (1) a first film exposure to occur when the exposure-controlling signal is proportional to scene brightness by the first factor, and (2) a second film exposure to occur when the exposure-controlling signal is proportional to scene brightness by the second factor, the first film exposure being greater than the second film exposure to compensate for the decrease in film speed when the film is exposed to light the intensity of which is less than the predetermined light intensity.

4. In a photographic camera having means for receiving a photographic film having a speed which decreases when exposed to low-intensity light, light-sensitive means for producing a photosignal having a parameter which corresponds to the intensity of scene light impinging on received film, timing means which, if responsive to the photosignal, produces an exposure terminating signal in an interval of time termed the uncompensated exposure time, and an actuatable shutter movable for initiating and terminating film exposure, the improvement comprising:

(a) current-mirror means for providing a reference signal having a parameter corresponding to a predetermined light intensity below which the speed of received photographic film decreases;

(b) switching means having an input coupled to said light-sensitive means and said current-mirror means, and an output coupled to said timing means, said switching means being responsive to the parameter of the photosignal and the parameter of the reference signal, and having (1) a first state for causing an exposure-controlling signal to be produced at its output that is proportional to the parameter of the photosignal by a first factor when the brightness of the scene is below the predetermined light intensity, and (2) a second state for causing an exposure-controlling signal to be produced at its output that is proportional to the parameter of the photosignal by a second factor when the scene brightness is above said predetermined light intensity;

(c) said timing means being responsive to the exposure-controlling signal to produce an exposure terminating signal in an interval of time termed the compensated exposure time, the compensated exposure time being greater than the uncompensated exposure time when the exposure-controlling signal is proportional to the photosignal's parameter by the first factor to compensate for the decrease in speed when the film is exposed to light which is less than the predetermined light intensity; and (d) means, responsive to the exposure terminating signal, for actuating said shutter to terminate a film exposure.

5. In a photographic camera having means for receiving a photographic film having a speed which decreases when exposed to low-intensity light, and light-sensitive means arranged to receive light for producing a primary light-dependent signal corresponding to the brightness of a scene, the improvement comprising:

(a) means, responsive to the primary light-dependent signal, for producing first and second secondary light-dependent signals relating to the brightness of the scene;

(b) means for providing a reference signal corresponding to a predetermined light intensity below which the speed of received photographic film decreases;

(c) switch means, responsive to (i) the reference signal and (ii) one of the secondary signals, having (1) a first condition for causing a difference signal to be produced when the last-mentioned secondary signal is greater than the reference signal and (2) a second condition for preventing the difference signal from being produced when the last-mentioned secondary signal is less than the reference signal, whereby a difference signal is produced when the brightness of the scene is above the predetermined light intensity;

(d) means for combining the other secondary signal and the difference signal to form an exposure-controlling signal; and (e) exposure-determining means, responsive to the exposure-controlling signal, for causing a first film exposure to occur when the difference signal has not been produced, and for causing a second film exposure to occur when the difference signal has been produced, the first film exposure being greater than the second film exposure to compensate for the decrease in speed when the film is exposed to light the intensity of which is less than the predetermined light intensity.

6. In a photographic camera having means for receiving a photographic film having a speed which decreases when exposed to low-intensity light, and means for producing a light-dependent signal corresponding to the brightness of a scene, the improvement comprising:
(a) means for providing a set of reference signals each of which relate to predetermined light intensities below which the speed of received photographic film decreases;
(b) means, responsive to the set of reference signals and the light-dependent signal, for causing an exposure-controlling signal to be produced which varies as a percentage of the light-dependent signal, the percentage increasing in correspondence with the brightness of the scene when the scene brightness is above a certain predetermined light intensity; and
(c) exposure-determining means, responsive to the exposure-controlling signal, for causing a film exposure to occur which varies in inverse proportion to the exposure-controlling signal to compensate for the change in speed when the film is exposed to low-intensity light.

7. In a photographic camera having means for receiving a photographic film having a speed which decreases when exposed to low-intensity light, and an actuatable shutter movable for initiating and terminating exposure of the film to light reflected from a photographic scene, the improvement comprising:
(a) a photometer located to receive light to produce a primary photosignal representing the brightness of the photographic scene;
(b) first current-mirror means, coupled to said photometer, responsive to the primary photosignal for forming n secondary photosignals where n is a positive integer greater than 1;
(c) second current-mirror means for providing n−1 reference signals, each of the reference signals being associated with one of the secondary photosignals and each of the reference signals representing a predetermined brightness below which the speed of received photographic film decreases;
(d) n−1 switches coupled between said first current-mirror means and said second current-mirror means, each of said n−1 switches being arranged for conducting a signal equal to the difference between one of the secondary photosignals minus that photosignal's associated reference signal when that secondary photosignal is greater than its associated reference signal;
(e) means, coupled to said first current-mirror means and said n−1 switches, for adding the secondary photosignal which is not associated with a reference signal and the conducted difference signals to form an exposure-controlling signal;
(f) timing means, responsive to the exposure-controlling signal, to produce an exposure terminating signal; and
(g) means, coupled between said timing means and said shutter, responsive to the exposure terminating signal for actuating said shutter to terminate exposure.

8. In a photographic camera having means for receiving a photographic film having a speed which decreases when exposed to high-intensity light, the improvement comprising:
(a) means arranged to receive light for producing a light-dependent signal corresponding to the brightness of a scene;
(b) means for providing a reference signal corresponding to a predetermined light intensity above which the speed of received photographic film decreases;
(c) switch means, responsive to (i) the reference signal, and (ii) the light-dependent signal, having (1) a first condition for causing an exposure-controlling signal to be produced that is related to scene brightness by a first factor when the brightness of the scene is below the predetermined light intensity, and (2) a second condition for causing an exposure-controlling signal to be produced that is related to scene brightness by a second factor when the brightness of the scene is above the predetermined light intensity; and
(d) exposure-determining means, connected to said switch means and associated with said film receiving means, for causing a first film exposure to occur when the exposure-controlling signal is related to scene brightness by the first factor, and for causing a second film exposure to occur when the exposure-controlling signal is related to scene brightness by the second factor, the second film exposure being greater than the first film exposure to compensate for the decrease in speed when the film is exposed to light the intensity of which is greater than the predetermined light intensity.

9. In a photographic camera having means for receiving a photographic film having a speed which decreases when exposed to high-intensity light, and an actuatable shutter movable for initiating and terminating exposure of the film to light, the improvement comprising:
(a) means for producing a photosignal corresponding to brightness of a scene;
(b) means for providing a reference signal corresponding to a predetermined light intensity above which the speed of received photographic film decreases;
(c) switch means, responsive to (i) the photosignal, and (ii) the reference signal, having (1) a first condition for causing an exposure-controlling signal to be produced that is proportional to scene brightness by a first factor when the brightness of the scene is below the predetermined light intensity, and (2) a second condition for causing an exposure-controlling signal to be produced that is proportional to scene brightness by a second factor when the brightness of the scene is above the predetermined light intensity; and
(d) timing means, coupled between said switch means and said shutter, responsive to the exposure-controlling signal to actuate said shutter to cause (1) a first film exposure to occur when the exposure-controlling signal is proportional to scene brightness by the first factor, and (2) a second film exposure to occur when the exposure-controlling signal is proportional to scene brightness by the second factor, the second film exposure being greater than the first film exposure to compensate for the decrease in speed when the film is exposed to light the intensity of which is greater than the predetermined light intensity.

10. In a photographic camera having means for receiving a photograhic film having a speed which decreases when exposed to high-intensity light, means for producing a photosignal having a parameter which corresponds to the intensity of scene light impinging on received film, timing means which, if responsive to the photosignal, produces an exposure terminating signal in an interval of time termed the uncompensated exposure time, and an actuatable shutter movable for initiating and terminating film exposure, the improvement comprising:
(a) means for providing a reference signal having a parameter corresponding to a predetermined light intensity above which the speed of the received film decreases;
(b) switching means, responsive to the parameter of the reference signal and the parameter of the photosignal, having (1) a first state for causing an exposure-controlling signal to be produced that is proportional to the parameter of the photosignal by a first factor when the light intensity of the photographic scene is below the predetermined light intensity, and (2) a second state for causing an exposure-controlling signal to be produced that is proportional to the parameter of the photosignal by a second factor when the scene light intensity is above the predetermined light intensity;
(c) said timing means being arranged to be responsive to the exposure-controlling signal to produce an exposure terminating signal in an interval of time termed the compensated exposure time, the compensated exposure time being greater than the uncompensated exposure time when the exposure-controlling signal is proportional to the photosignal's parameter by the second factor to compensate for the decrease in speed when the film is exposed to light which is greater than said predetermined light intensity; and
(d) means, responsive to the exposure terminating signal, for actuating said shutter to terminate a film exposure.

* * * * *

UNITED STATES PATENT OFFICE
CERTIFICATE OF CORRECTION

PATENT NO. : 4,264,163
DATED : April 28, 1981
INVENTOR(S) : William K. Hickok and Robert C. Wheeler It is certified that error appears in the above-identified patent and that said Letters Patent are hereby corrected as shown below:

| | |
|---|---|
| Column 2, Line 67 | Please delete "levelsensing" and substitute therefor --level-sensing-- |
| Column 3, Line 54 | After elements, please delete "do" |
| Column 4, Line 55 | Please delete "shortduration" and substitute therefor --short-duration-- |
| Column 8, Line 30 | Please delete "$I_{80}(t)$" and substitute therefor --$I_\lambda(t)$-- |
| Column 9, Line 34 | Please delete "$I_\Delta(t)$" and substitute therefor --$I_\lambda(t)$-- |
| Column 10, Line 6 | Please delete "$I_\Delta(t)$" and substitute therefor --$I_\lambda(t)$-- |
| Column 10, Line 33 | Please delete "conected" and substitute therefor --connected-- |

Signed and Sealed this

Twenty-first Day of July 1981

[SEAL]

Attest:

GERALD J. MOSSINGHOFF

Attesting Officer  Commissioner of Patents and Trademarks